United States Patent [19]
Massie

[11] 3,900,479

[45] Aug. 19, 1975

[54] PROCESS FOR THE CYCLIALKYLATION OF AMINES

[75] Inventor: Stephen N. Massie, Palatine, Ill.

[73] Assignee: Universal Oil Products Company, Des Plaines, Ill.

[22] Filed: Dec. 27, 1973

[21] Appl. No.: 428,644

[52] U.S. Cl. ............. 260/293.64; 260/293.51; 260/293.79; 260/326.47; 260/326.8; 260/326.85

[51] Int. Cl.² ...................... C07D 295/00

[58] Field of Search..... 260/293.51, 293.64, 293.79, 260/326.47, 326.8, 326.85

[56] References Cited
FOREIGN PATENTS OR APPLICATIONS
6,605,492  11/1966  Netherlands.............. 260/293.51

OTHER PUBLICATIONS

C. A. 66: 85,703s (1967), Abstract of Neth. Appl., 6,605,492.

Heterocyclic Systems with Bridgehead Nitrogen Atoms, Part One, Mosby (1961), pp. 1–4 & Table of Contents.

Heterocyclic Systems with Bridgehead Nitrogen Atoms, Part Two Mosby (1961), Table of Contents.

*Primary Examiner*—Henry R. Jiles
*Assistant Examiner*—S. D. Winters
*Attorney, Agent, or Firm*—James R. Hoatson, Jr.; Raymond H. Nelson; William H. Page II

[57] ABSTRACT

Primary amines may be cyclialkylated by treatment with a heterocyclic oxygen compound in the presence of a catalyst system comprising a polyheterocyclic amine having a nitrogen in the bridgehead position and a component selected from the group consisting of a halogen acid, a metal selected from Group VIII of the Periodic Table dispersed on an inorganic oxide support and a sulfonic acid-substituted divinyl benzene-styrene copolymer resin.

11 Claims, No Drawings

PROCESS FOR THE CYCLIALKYLATION OF AMINES

This invention relates to a process for preparing a heterocyclic nitrogen compound. More specifically, this invention relates to a process for preparing a heterocyclic nitrogen compound which comprises cyclialkylating a primary amine by treatment with a heterocyclic oxygen compound in the presence of a catalyst system comprising a polyheterocyclic amine having a nitrogen in the bridgehead position and a component selected from the group consisting of a halogen acid, a metal selected from Group VIII of the Periodic Table dispersed on an inorganic oxide support and a sulfonic acid-substituted divinyl benzene-styrene copolymer resin.

It has been shown in the prior art that heterocyclic nitrogen compounds such as pyrrolidine may be formed by treating tetrahydrofuran with ammonia in the presence of an alumina catalyst which had been treated with boric acid. Furan has been shown to be converted to pyrrole over an alumina catalyst. It has also been shown that thallium oxide deposited upon alumina or gamma-alumina utilized in conjunction with iron in a stainless steel or aluminum reactor may be used in the conversion of tetrahydrofuran and ammonia to pyrrolidine. One well known reaction is the Eshweiler-Clark reaction which forms N-methylpyrrolidine from the reaction of tetrahydrofuran and ammonia, said reaction being followed by the methylation of the pyrrolidine. The Hoffman-Loeffer reaction provides for the cyclization of a primary halogenic amine in concentrated sulfuric acid to obtain an N-monochloro derivitive of the primary amines which upon neutralization gives the desired corresponding pyrrolidine.

It has also been shown in the prior art that certain polyheterocyclic amines having a nitrogen in the bridgehead position may be used as catalysts for various reactions. One such polyheterocyclic amine having a nitrogen in the bridgehead position is 1,4-diazalbicyclo[2.2.2]octane which has been shown as a catalyst in the formation of polymethanes and as a cocatalyst with a Group VIII metal in hydroformylation reactions. The 1,4-diazabicyclo[2.2.2]octane (commonly known as DABCO) has also been shown to be utilized as a reaction media in the preparation of tertiary amines.

In contradistinction to the prior art, it has now been discovered that a heterocyclic nitrogen compound may be prepared by the cyclialkylation of a primary amine by treatment with a heterocyclic oxygen compound in the presence of a catalyst system comprising a polyheterocyclic amine having a nitrogen in the bridgehead position and a component selected from the group consisting of a halogen acid, a metal selected from Group VIII of the Periodic Table dispersed on an inorganic oxide support and a sulfonic acid-substituted divinyl benzene-styrene copolymer resin. The utilization of the above-cited invention will allow the manufacturer to increase the percentage yield of the heterocyclic nitrogen compound plus enhance the quantity of nitrogen substituents as a result of the increase in the control of the cyclialkylation reaction. The present invention will also decrease the cost of production of the heterocyclic nitrogen compound as a consequence of the elimination of expensive heat-producing equipment which will no longer be necessary as a result of the decrease in the quantity of heat that will be necessary to effect the cyclialkylation reaction. The increased yields from the starting materials, savings of the heat and heat-producing equipment will result in a conservation of energy needed for the preparation of the desired reaction.

The desired products of this invention, namely, the heterocyclic nitrogen compounds are utilized in the chemical industry in many ways. Some of the ways these heterocyclic nitrogen compounds are used are exemplified by the use of pyrrolidine as an insecticide, as a rubber accelerator, for citrus decay control, as a catalyst for epoxy resin formation, as an inhibitor or as an intermediate in the production of pharmaceuticals; the use of piperidine as a solvent in organic chemical intermediate, as an ingredient in oils and fuels; or the use of 4,4'-bis-(N-piperidinyl)diphenylmethane and 4,4'-bis-(N-pyrrolidinyl)diphenylmethane as catalysts in the preparation of organic copolymers or as antioxidants in gasoline.

It is therefore an object of this invention to provide a process for the preparation of a heterocyclic nitrogen compound.

A further object of this invention is to provide a process for the preparation of a heterocyclic nitrogen compound by the cyclialkylation of an amine with a heterocyclic oxygenated compound in the presence of a certain catalytic composition of matter which will permit the recovery of the desired products in a more pecuniarily rewarding manner.

In one aspect, an embodiment of this invention resides in a process for the preparation of a heterocyclic nitrogen compound which comprises cyclialkylating a primary amine by treatment with a heterocyclic oxygen compound in the presence of a catalyst system comprising a polyheterocyclic amine having a nitrogen in the bridgehead position and a component selected from a group consisting of a halogen acid, a metal selected from Group VIII of the Periodic Table dispersed on an inorganic oxide support and a sulfonic acid-sutstituted divinyl benzene-styrene copolymer resin at reaction conditions and recovering the resultant heterocyclic nitrogen compound.

A specific embodiment of this invention resides in a process for preparing a heterocyclic nitrogen compound which comprises cyclialkylating methylenedianiline by treatment with tetrahydrofuran in the presence of a catalyst system comprising 1,4-diazabicyclo[2.2.2]octane and iridium dispersed on an alumina support at a temperature in the range of from about 150°C. to about 200°C. and a pressure of from about 5 atmospheres to about 100 atmospheres and recovering the resultant heterocyclic nitrogen compounds, namely a mixture of 4-amino-4'-(N-pyrrolidinyl)diphenylmethane and 4,4'-bis-(N-pyrrolidinyl)diphenylmethane.

Another specific embodiment of this invention resides in a process for preparing a heterocyclic nitrogen compound which comprises cyclialkylating n-butyl amine by treatment with tetrahydrofuran in the presence of a catalyst system comprising 1,4-diazabicyclo[2.2.2]octane and sulfonic acid-substituted divinyl benzene-styrene copolymer resin at a temperature of 250°C. and a pressure of 75 atmospheres and recovering the desired heterocyclic nitrogen compound, namely, N-n-butylpyrrolidine.

Other objects and embodiments will be found in the following further detailed description of the present invention.

As hereinbefore set forth, the present invention is concerned with a process for preparing a heterocyclic nitrogen compound, said process being effected by cyclialkylating a primary amine by treatment with a heterocyclic oxygen compound in the presence of a catalyst system comprising a polyheterocyclic amine having a nitrogen in the bridgehead position and a component selected from the group consisting of a halogen acid, a metal selected from Group VIII of the Periodic Table dispersed on an inorganic oxide support and a sulfonic acid composited on a divinyl benzene-styrene copolymer resin. The reaction is effected under a reaction condition which includes an elevated temperature in the range of from about 100°C. to about 300°C. and preferably in the range of from about 100°C. to about 200°C. In addition, another reaction condition involves pressure, said pressure ranging from about atmospheric up to about 200 atmospheres or more. When superatmospheric pressures are employed, said pressures are afforded by the introduction of a substantially inert gas such as nitrogen, helium or argon into the reaction zone, the particular pressure which is used being that which is necessary to maintain a major portion of the reactants in the liquid phase. It is also contemplated within the scope of this invention that any number of substantially inert gases may be used in a mixture such as nitrogen and helium; nitrogen and argon; helium and argon; helium, argon, and krypton; etc.

Examples of suitable primary amines which may be utilized as one of the starting materials in the process of this invention include primary monoamines or primary polyamines as in accordance with the set forth Structure I:

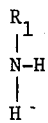

STRUCTURE I wherein $R_1$ is hydrogen, alkyl, hydroxyalkyl, aryl, diaryl, carboxyalkyl, alkene, alkylene, or alkylaryl radicals having a carbon number ranging from 0 to about 20 carbon atoms; and Structure II:

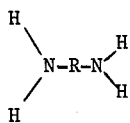

STRUCTURE II wherein R is an alkyl, aryl, diaryl, diarylalkyl, alkene, allylene, or alkylaryl radical having a carbon number ranging from about 2 to about 20 carbon atoms. Examples of suitable starting materials in accordance with the above set forth promulgated Structures I and II include ammonia, methyl amine, ethyl amine, propyl amine, heptyl amine, octyl amine, nonyl amine, aniline, 2-methylaniline, 4-methylaniline, 2,4-dimethylaniline, 3-ethylaniline, 3,5-dipropylaniline, 2-methyl-3-ethyl-5-propylaniline, 3-chloroaniline, naphthylaniline, 3-ethoxyaniline, 3,5-diethoxyaniline, vinyl amine, allyl amine, ethanol amine, p-tolyl amine, o-tolyl amine, ethylenediamine, trimethylenediamine, hexamethylenediamine, p-phenylenediamine, o-phenylenediamine, m-phenylenediamine, methyl-p-phenylenediamine, 2,-4-diethyl-1,4-diaminobenzene, 1,5-diaminonaphthalene, 1,4-diamino-2-butene, methylenedianiline, bis(4-aminocyclohexyl)methane, etc.

Suitable heterocyclic oxygen compounds which may be reacted with the aforementioned primary amines would include, but are not limited to, tetrahydrofuran, 2-methyltetrahydrofuran, 2,3-dimethyltetrahydrofuran, 2-methyl-3-ethyltetrahydrofuran, 2-methoxytetrahydrofuran, 2-methoxy-3-ethoxytetrahydrofuran, 2-chlorotetrahydrofuran, 2,3-dichlorotetrahydrofuran, 2-bromotetrahydrofuran, 2-vinyltetrahydrofuran, 2,4-divinyltetrahydrofuran, tetrahydrofuroic acid, tetrahydro-3,4-furan dicarboxylic acid, 2-tolyltetrahydrofuran, 2,4-di-(3,5-xylyl)tetrahydrofuran, tetrahydropyran, 2-methyltetrahydropyran, 2,3-dimethyltetrahydropyran, 2-methyl-3-ethyltetrahydropyran, 2-methoxytetrahydropyran, 2-methoxy-3-ethoxytetrahydropyran, 2-chlorotetrahydropyran, 2,3-dichlorotetrahydropyran, 2-bromotetrahydropyran, 2-vinyltetrahydropyran, 2,4-divinyltetrahydropyran, tetrahydro-2-pyrancarboxylic acid, tetrahydro-2,3-pyrandicarboxylic acid, 2-tolyltetrahydropyran, 2,-4-di-p-xylyltetrahydropyran, 2,3-dihydrofuran, 3,4-dihydrofuran, pyran, 3,4-dihydropyran, 2,6-dihydropyran, furoic acid, 3,4-furandicarboxylic acid, etc. It is understood that the aforementioned primary amines and heterocyclic oxygen compounds are only representative of the class of compounds which may be employed and are not necessarily limited thereto.

The catalytic system of the process of this invention comprises a polyheterocyclic amine having a nitrogen in the bridgehead position and a component selected from the group consisting of a halogen acid, a metal selected from Group VIII of the Periodic Table dispersed on an inorganic oxide support and a sulfonic acid-substituted divinyl benzene-styrene copolymer resin. Examples of suitable polyheterocyclic amines having a nitrogen in the bridgehead position would include 1,4-diazabicyclo[2,2,2]octane, 1-azabicyclo[3.3.1]heptane; 1-azabicyclo[2.1.1]hexane; 1-azabicyclo[2.2.1]heptane; 1-azabicyclo[2.2.1]heptane; 1,4-methano-1,4-dihydropyridine; 3-oxa-1-azabicyclo[2.2.1]heptane; 1,4-diazabicyclo[2.2.1]heptane; 1-azabicyclo[3.2.1]octane; 1,6-diazabicyclo[4.2.2]decane; 3-oxa-1-azabicyclo[3.2.1]octane; 1,3-diazabicyclo[3.2.1]octane; 1-azabicyclo[3.3.1]-nonene, also known is 1-isogranatinine and the oxo, hydroxy and lower alkyl derivitives thereof; 1-azabicyclo[2.2.2]octane also known as quininelidine as well as the halo, oxo, hydroxy and lower alkyl derivitives thereof; 1,3-diazabicyclo[2.2.2]octane; 1,3-diazabicyclo[3.3.1]nonane; 1,5-diazabicyclo[3.3.1]nonene; 1,2,5,8-tetrazatricyclo[5.3.1]dodecane; 1,4-diazabicyclo[2.2.2]octane also known as triethylenediamine and its oxo, hydroxy, halo and lower alkyl derivatives thereof; 1,3-diazadamantane; pentamethylenetetramine; hexamethylenetetramine; etc. The second component of the catalyst system may be selected from a group consisting of a halogen acid, a metal selected from Group VIII of the Periodic Table dispersed on an inorganic oxide support and a sulfonic acid-substituted divinyl benzene-styrene copolymer resin. Examples of suitable halogen acids would include hydrogen chloride, hydrogen bromide, hydrogen iodide, hydrogen fluoride, etc. It is also contemplated within the scope of this invention that the halogen acids may be present as absorbed upon an inorganic oxide support. Suitable examples of metals which may be selected from Group VIII of the Periodic Table would include iron, cobalt, nickel, ruthenium, rhodium, palladium, osmium, iridium, platinum, etc. and suitable examples of inorganic oxide supports would include alumina, silica, magnesia, zirconium oxide, thallium oxide, etc.; suitable examples of sulfonic acid-substituted divinyl benzene-styrene copolymer resins would include both low and high surface area sulfonic acid resins such as Amberlyst-15, Dowex MSC-1, Dowex 50-X8, Dowex 50W-8X, Dowex 50W-X10, etc. It is understood that the aforementioned polyheterocyclic amines having a nitrogen in the bridgehead position, halogen acids, metals selected from Group VIII of the Periodic Table, inorganic oxide supports and sulfonic acid resins are only representative of the class of compounds which may be employed and are not necessarily limited thereto.

The process of this invention may be effected in any suitable manner and may comprise either a batch or continuous type operation. For example, when a batch type operation is employed, the reactants comprising the primary amine and the heterocyclic oxygen compound are placed in appropriate apparatus along with a viable catalyst system as hereinbefore set forth. If atmospheric pressure is to be employed, the reaction vessel is then heated to a predetermined operating temperature and maintained thereat for a period of time which may range from 0.5 hours up to 50 hours or more at which time, the heating is discontinued and the vessel allowed to return to room temperature. The reaction mixture is then recovered, separated from the catalyst system and subjected to conventional means of purification and separation, said means including washing, drying, filtration, extraction, evaporation, fractional distillation, etc., whereby the desired heterocyclic nitrogen compound or compounds are recovered. Alternatively, if superatmospheric pressures are to be employed in the reaction, the reactants are charged to the pressure vessel such as a rotating autoclave which contains a viable catalyst system comprising a polyheterocyclic amine having a nitrogen in the bridgehead position and a component selected from the group consisting of a halogen acid, a metal selected from Group VIII of the Periodic Table dispersed on an inorganic oxide support and a sulfonic acid-substituted divinyl benzene-styrene copolymer resin. The autoclave is sealed and a substantially inert gas such as nitrogen or helium is pressed in until the desired operating pressure is reached. The autoclave is then heated to a desired operating temperature and maintained thereat for a predetermined residence time. At the end of this time, heating is discontinued, the autoclave is allowed to return to room temperature and the excess pressure is discharged. The autoclave is opened and the reaction mixture is then treated in a manner similar to that hereinbefore set forth whereby the desired heterocyclic nitrogen products are separated and recovered.

It is also contemplated within the scope of this invention that the reaction process for obtaining the desired heterocyclic nitrogen compound may be effected in a continuous manner of operation. When such a type of operation is employed, the reactants are continuously charged to the reaction vessel containing a viable catalyst system as hereinbefore set forth, said vessel being maintained at proper operating conditions of temperature and pressure. After completion of the desired residence time, the reactor effluent is continuously withdrawn and subjected to conventional means of separation whereby the desired heterocyclic nitrogen compound is recovered, while any unreacted starting materials comprising the heterocyclic oxygen compound and the primary amine are recycled to reaction zone to form a portion of the feedstock. Inasmuch as one portion of the catalytic system of the present invention comprises a solid material, various types of continuous operations may be used. One such type of operation comprises a fixed bed method in which the solid catalyst is disposed as a fixed bed in the reaction zone and the reactants and polyheterocyclic amine are passed over said fixed bed in either an upward or downward flow. Another type of operation which may be employed comprises a moving bed-type operation in which the catalyst is carried into the reaction zone as a slurry in either or both of the reactants and polyheterocyclic amine. When a diamine is utilized, it is found that the change in the mole ratio will have an effect on the percentage of conversion of the primary amine compounds, said mole ratio being from about 10 parts of heterocyclic oxygen compound to about 1 to 20 parts of primary amine.

Examples of heterocyclic nitrogen compounds which may be prepared according to the process of this invention will include pyrrolidine, N-ethylpyrrolidine, N-methyl-2-methylpyrrolidine, 4-amino-4'-(N-pyrrolidinyl)diphenylmethane, 4,4'-bis-(N-piperidinyl)-diphenylmethane, -bis-(N-pyrrolidinyl)-diphenylmethane, -bix-(N-pyrrolidinyl)diphenylmethane, 4,4'-bis-(N-piperidinyl)-2,2-diphenylpropane, 4,4'-bis-(N-pyrrolidinyl)diphenylbutane, 4,4'-bis-(N-piperidinyl)diphenylpentane, 4,4'-bis-(N-pyrrolidinyl)-1,6-diphenylhexane, 2-(N-pyrrolidinyl)benzoic acid, di[N-(2-ethyl)pyrrolidinyl]benzene, N-propylpyrrolidine, N-butylpyrrolidine, 1,6-di[N-pyrrolidinyl]hexane, N-butylpyrrolidine, N-decylpyrrole, etc. It is to be further understood that the aforementioned heterocyclic nitrogen compounds are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

To a rotating autoclave, were added 9.9 grams of methylenedianiline and 70.6 grams of tetrahydrofuran along with a catalyst comprising 1% iridium on an alumina support. The rotating autoclave was equipped with means for effecting and maintaining heat and with pressure level determining devices. The rotating autoclave was heated to a temperature of 175°C. under 100 atmospheres initial nitrogen pressure and maintained thereat for 4 hours, after which the rotating autoclave was allowed to return to room temperature. The product was recovered, separated from the catalyst by filtration and analyzed by means of gas chromatography instrumentation which disclosed the product to be a mixture of 4-amino-4'-(N-pyrrolidinyl)-diphenylmethane and 4,4'-bis-(N-pyrrolidinyl)diphenylmethane with a percentage selectivity of 32 percent to the heterocyclic nitrogen compounds and an 85 percent conversion of the original reactant, methylenedianiline.

EXAMPLE II

In this example, 9.9 grams of methylenedianiline and 70.6 grams of tetrahydrofuran were added to a rotating autoclave containing a catalyst system comprising 0.036 grams of 1,4-diazabicyclo-[2.2.2]octane and 3.0 grams of a 1% iridium on an alumina support, said rotating autoclave being equipped with means for effecting and maintaining heat and with pressure level determining devices. The rotating autoclave was heated to a temperature of 175°C. under 100 atmospheres initial nitrogen pressure and maintained thereat for 4 hours, after which time the rotating autoclave was allowed to return to room temperature. The product was recovered, separated from the catalyst by filtration and analyzed by means of gas chromotography instrumentation which disclosed the product to be a mixture of 4-amino-4'-(N-pyrrolidinyl(diphenylmethane and 4,4'-bis-(N-pyrrolidinyl)diphenylmethane with a selectivity of 44 percent to the heterocyclic nitrogen compounds and a 59 percent conversion of the original reactant, methylenedianiline.

It can be clearly seen from a comparison of Example I to Example II that the percentage selectivity to the desired heterocyclic nitrogen compounds increased from 32 percent of Example I to 44 percent of Example II, an increase of 12 percent by the addition of the catalyst system comprising the 1,4-diazabicyclo[2.2.2]octane and the 1% iridium dispersed on the alumina support. It should also be noted that the percent conversion of the methylenedianiline was reduced, however, not to a sufficient degree so as to make the process economically undesirable.

EXAMPLE III

In this example, 73.0 grams of n-butyl amine and 62.0 grams of tetrahydrofuran are added to an autoclave which is equipped with heating and pressure devices along with a catalyst system comprising 1,4-diazabicyclo[2.2.2]octane and 1% cobalt dispersed on a silica support. The autoclave is heated to a temperature of 250°C. and maintained at a pressure of 15 atmospheres for a period of 6 hours at which time the autoclave is allowed to return to room temperature and ambient pressure. The product is recovered, separated from the catalyst system by filtration and analyzed by means of nuclear magnetic resonance spectroscopy and infra-red spectroscopy instrumentation which discloses the product to be N-n-butylpyrrolidine. A lesser amount of the product is realized in the cyclialkylation of the n-butyl amine and tetrahydrofuran when the 1,4-diazabicyclo-[2.2.2]octane is not present in the catalyst system.

EXAMPLE IV

In this example, 93.0 grams of n-butyl amine and 144.0 grams of 2-methyltetrahydrofuran are added to an autoclave which is equipped with heating and pressure devices along with a catalyst system comprising 1,4-diazabicyclo[2.2.2]octane and 0.5 grams of hydrochloric acid. The autoclave is heated to a temperature of 150°C. and maintained at a pressure of 100 atmospheres for a period of 8 hours at which time the autoclave is allowed to return to room temperature and ambient pressure. The product is recovered, separated from the catalyst by filtration and analyzed by means of nuclear magnetic resonance spectroscopy and infra-red spectroscopy instrumentation which discloses the product to be N-n-butyl-2-methylpyrrolidine. A lesser amount of the product is realized when the cyclialkylation of the n-butyl amine with the 2-methyltetrahydrofuran is effected without the presence of the 1,4-diazabicyclo[2.2.2]octane in the catalyst system.

EXAMPLE V

In this example, 93.0 grams of aniline and 144.0 grams of ethyl 2-tetrahydrofuroate are added to an autoclave which is equipped with heating and pressure devices along with a catalyst comprising 1,4-diazabicyclo[2.2.2]octane and a sulfonic acid-substituted divinyl benzene-styrene copolymer resin. The autoclave is heated to a temperature of 170°C. and maintained at a pressure of 100 atmospheres for a period of time comprising 8 hours at which time the autoclave is allowed to return to room temperature and ambient pressure. The product is recovered, separated from the catalyst by filtration and analyzed by means of nuclear magnetic resonance spectroscopy and infra-red spectroscopy instrumentation which disclosed the product to be ethyl N-phenylpyrrolidine-2-carboxylate. A lesser amount of the product is realized in the cyclialkylation of the amine with the ethyl 2-tetrahydrofuroate when 1,4-diazabicyclo[2.2.2]octane is not present in the catalyst system.

EXAMPLE VI

In this example, 108.0 grams of p-phenylenediamine and 84.0 grams of 2,5-tetrahydropyran are added to an autoclave which is equipped with heating and pressure devices along with a catalyst system comprising 1,4-diazabicyclo[2.2.2]octane and iridium dispersed on an alumina support. The autoclave is heated to a temperature of 275°C. and maintained at a pressure of 50 atmospheres for a period of time comprising 4 hours at which time the autoclave is allowed to return to room temperature and ambient pressure. The product is recovered, separated from the catalyst system by filtration and analyzed by means of nuclear magnetic resonance spectroscopy and infra-red spectroscopy instrumentation which discloses the product to be a mixture of 1,4-bis-(N-piperdinyl)benzene and 4-(piperidinyl)aniline. A lesser amount of the product is realized in the cyclialkylation of the p-phenylenediamine with the tetrahydropyran in cases in which the 1,4-diazabicyclo[2.2.2]octane is not present in the catalyst system.

I claim as my invention:

1. A process for the preparation of a heterocyclic nitrogen compound which comprises cyclialkylating a primary amine by reaction thereof with a tetrahydrofuran or a tetrahydropyran at a temperature of from about 100°C. to about 300°C. and a pressure of from about 1 to about 200 atmospheres in the presence of a catalyst system comprising 1,4-diazabicyclo[2.2.2] octane and a component selected from the group consisting of a hydrogen halide, a metal from Group VIII of the Periodic Table dispersed on an inorganic oxide support and a sulfonic acid-substituted divinyl benzene-styrene copolymer resin, and recovering the resultant heterocyclic nitrogen compound.

2. The process of claim 1 further characterized in that said primary amine is selected from the group consisting of methylenedianiline, n-butylamine, aniline and p-phenylenediamine.

3. The process of claim 1 further characterized in that the Group VIII metal is iridium and the inorganic oxide support is alumina.

4. The process of claim 1 further characterized in that the Group VIII metal is cobalt and the inorganic oxide support is silica.

5. The process of claim 1 further characterized in that the hydrogen halide is hydrochloric acid.

6. The process of claim 1 further characterized in that said component is sulfonic acid-substituted divinyl benzene-styrene copolymer resin.

7. The process of claim 1 further characterized in that said primary amine is methylenedianiline which is reacted with tetrahydrofuran and the heterocyclic nitrogen compound is a mixture of 4-amino-4'-(N-pyrrolidinyl)diphenylmethane and 4,4'-bis-(N-pyrrolidinyl) diphenylmethane.

8. The process of claim 1 further characterized in that said primary amine is n-butylamine which is reacted with tetrahydrofuran, and the heterocyclic nitrogen compound is N-n-butylpyrrolidine.

9. The process of claim 1 further characterized in that said primary amine is n-butylamine which is reacted with 2-methyltetrahydrofuran and the heterocyclic nitrogen compound is N-n-butyl-2-methylpyrrolidine.

10. The process of claim 1 further characterized in that said primary amine is aniline which is reacted with ethyl 2-tetrahydrofuroate and the heterocyclic nitrogen compound is ethyl N-phenylpyrrolidine-2-carboxylate.

11. The process of claim 1 further characterized in that said primary amine is p-phenylenediamine which is reacted with 2,5-tetrahydropyran and the heterocyclic nitrogen compound is a mixture of 1,4-bis-(N-piperdinyl)benzene and 4-(N-piperidinyl)aniline.

* * * * *